(12) United States Patent
Jones et al.

(10) Patent No.: US 7,187,713 B2
(45) Date of Patent: Mar. 6, 2007

(54) METHOD AND APPARATUS FOR INTELLIGENT MODEM WARM START

(75) Inventors: William W. Jones, San Diego, CA (US); Ragnar H Jonsson, Reykjavik (IS)

(73) Assignee: Mindspeed Technologies, Inc., Newport Beach, CA (US)

( * ) Notice: Subject to any disclaimer, the term of this patent is extended or adjusted under 35 U.S.C. 154(b) by 765 days.

(21) Appl. No.: 10/158,992

(22) Filed: May 29, 2002

(65) Prior Publication Data

US 2003/0223481 A1 Dec. 4, 2003

(51) Int. Cl.
*H04B 1/38* (2006.01)
(52) U.S. Cl. .................................... 375/222
(58) Field of Classification Search ............ 375/219, 375/222, 377; 725/111
See application file for complete search history.

(56) References Cited

U.S. PATENT DOCUMENTS

| | | | |
|---|---|---|---|
| 4,719,643 A | 1/1988 | Beeman | |
| 4,947,425 A | 8/1990 | Grizmala et al. | |
| RE35,607 E | 9/1997 | Nagammune et al. | |
| 5,699,402 A | 12/1997 | Bauer et al. | |
| 5,745,167 A * | 4/1998 | Kageyu et al. | 348/153 |
| 6,075,628 A | 6/2000 | Fisher et al. | |
| 6,570,915 B1 * | 5/2003 | Sweitzer et al. | 375/225 |
| 6,711,207 B1 * | 3/2004 | Amrany et al. | 375/222 |
| 6,829,252 B1 * | 12/2004 | Lewin et al. | 370/493 |
| 2003/0048835 A1 * | 3/2003 | Noma et al. | 375/222 |

OTHER PUBLICATIONS

Cambridge University Press; Numerical Recipes Software in C: The Art of Scientific Computing; Correlation and Autocorrelation Using the FFT; pp. 545 through 558 (located on the internet); 1982-1992.
Jack P.F. Glas; Code Selection; last modified on Nov. 13, 1996 (located on the internet).
Jack Glas; Circuit Systems; The Principles of Spread Spectrum Communication; last modified Aug. 29, 1996 (internet research).
Dr. George Zimmerman; PairGain Technologies; HDSL2 Tutorial: Spectral Compatibility and Real-World Performance Advances; Jun. 23, 1998; Sweden; pp. 1 through 12.
Sam Shearman; National Instruments; Tone Detection Fits Waveform Frequency in LabVIEW 6i; 4 pages (located on the internet); Circa unknown.
Autocorrelation; The Math Works, Inc. 1194-2000; 32 pages (located on the internet).

* cited by examiner

*Primary Examiner*—Young T. Tse
(74) *Attorney, Agent, or Firm*—Weide & Miller, Ltd.

(57) ABSTRACT

Modem start-up delay reduced by measuring condition of communications line upon connection termination. Variation between termination and start-up line conditions determines if cold or warm start is required. Warm-start may use original condition descriptors. Condition represented by ambient noise, echo or spectral response of channel.

34 Claims, 8 Drawing Sheets

METHOD AND APPARATUS FOR INTELLIGENT MODEM WARM START

FIELD OF THE INVENTION

This invention relates generally to modem startup technology.

BACKGROUND OF THE INVENTION

The term "modem" refers to communications equipment that enables the transmission of digital information using audio channels. The term itself refers to the act of "modulation" and "demodulation". At the sending end, digital information is used to modulate a signal that can be carried over a communications channel. Once the modulated signal arrives at its destination, it is demodulated in order to recover the digital information it is carrying.

Conventional voice-band modems typically operate in the audio band of a telecommunications voice channel. Because of the limited bandwidth available over these voice channels, sophisticated modulation techniques were developed in attempts to drive more and more data through the line. As modem technology evolved, the bandwidth of traditional voice channels was exploited to a theoretical maximum limit. This limit then needed to be overcome.

Digital subscriber line (DSL) is one technology that has been developed in efforts to overcome the bandwidth limitations of voice-band modems. Different DSL technologies use different modulation techniques. The modulation techniques most commonly used for DSL are pulse amplitude modulation (PAM), quadrature amplitude modulation (QAM), carrierless amplitude modulation (CAP), and discrete multi-tone (DMT). PAM modulation varies the amplitude of a base-band signal to convey information to the remote modem. QAM and CAP modulations modulate the phase and amplitude of a carrier signal to convey information to a remote modem. DMT uses QAM modulation to modulate a large number of individual carrier signals. As the data carrying capabilities of a communications line vary, the DMT modulation strategy can vary the amount of data that is carried by each individual QAM modulated carrier. This may be accomplished by changing the modulation density for each individual carrier.

A communications channel may not always be able to carry a maximum amount of data. This is because the communications channel may not be able to propagate a modulated signal with sufficient fidelity so that it can be demodulated at a receiving modem. The condition of a communications channel dictates just how much data can be carried by the channel; and the condition of a channel may actually vary with time.

The condition of a communication channel may be described in terms of noise. Noise comprises both naturally occurring and externally induced radiation that may be coupled into the communications medium. A communication channel may also be characterized in terms of its transfer function. The transfer function describes the attenuation of signals carried on the line as a function of signal frequency. Channel condition may also be defined in terms of an echo characteristic. The echo condition of a channel describes the amount of signal reflected back to the transmitter and is typically defined in terms of a reflection factor versus signal frequency.

In order to maximize data throughput, modern modems monitor the condition of the communications channel and use sophisticated methods to compensate for temporal variations in the communications channel. Through the use of digital signal processing, modems can minimize the effects that noise may impose on the communications channel. Other signal processing techniques allow modems to compensate for any echoed signal that might be received on the line. Still other techniques enable modems to equalize the spectral response of a communications channel. All of these technique may be used to improve the ability of a modem to recover a modulated signal.

Typically, modems engage in a startup sequence that comprises various forms of communications channel characterization. Such startup sequences are executed whenever a communications link is established. These startup sequences are costly in terms of the amount of time that is required to characterize the channel. It goes without saying that while modems are engaged in communications channel characterization, virtually no data can be transmitted or received.

Many types of modems also require significant power because of the amount of energy needed to drive a signal on to the line from a subscriber facility to a central office. Because of this, it becomes advantageous at the systems level to quiesce data channels when they are not needed. This may reduce overall power consumption and heating internal to a modem. By severing a modem connection when it is not needed, telecommunications networks may also experience a reduced risk of crosstalk. From the perspective of any individual subscriber, though, shutting down a modem connection could reduce the data throughput that would otherwise be available. Every time the modem connection needs to be re-established, some amount of delay would be incurred due to execution of a modem startup sequence.

A typical startup sequence comprises a channel characterization phase and a coefficient exchange phase. During channel characterization, the modem may use several techniques to determine the condition of the communications channel. Among these, the modem may monitor channel noise, determine the echo-path-model for the line, and it may determine the spectral response of the channel. In any of these techniques, the modem typically develops a series of coefficients that describe and/or quantify the corresponding line attributes. In the coefficient exchange phase, the modem may need to communicate some or all of the line attribute coefficients that were developed during the characterization phase to the corresponding modem receiving the modulated carrier signal.

SUMMARY OF THE INVENTION

The present invention is a process intended to reduce the delay in re-establishing modem connections that have been severed. The present method considers that the condition of the line may not have changed radically since the modem connection was terminated. In this situation, the modem may not need to engage in a full "cold-start" sequence. If the condition of the communications channel has not varied significantly from when the modem connection was terminated, the modem may be able to use a "warm-start" sequence.

Two different sample embodiments of the present invention are taught. The first example embodiment is referred to as the warm-start selection process. In this example embodiment, a monitoring capability is provided in a modem for measuring communications channel condition. This monitoring capability determines if the modem needs to run a cold-start, or if a warm-start would be sufficient to reestablish the connection. The second example embodiment is referred to as the integrated warm-start sequence. The integrated warm-start sequence combines the monitoring function together with warm and cold start functionality into a single integrated start-up method.

In the method of warm-start selection, the first step is to determine if an existing modem connection needs to be terminated. If the existing connection needs to be terminated, the method provides that the condition of the communications channel should be captured. The channel condition is stored as an initial channel condition profile.

Once the modem connection is terminated, the method provides that a timer be established. Within this timer loop, the method requires that a measurement of channel condition be taken periodically and stored as a current channel condition profile. Also within the timer loop, this first illustrative method provides for checking if the modem connection needs to be re-established.

If the modem connection needs to be re-established, the method requires that the timer loop should be truncated. After falling out of the timer loop, the method calls for comparison of the initial and current channel condition profiles. Should this comparison reveal that the line condition has not varied significantly, a warm-start may be executed and the modem connection may then re-established. If the variation in communications channel condition is intolerably large, this example method of the present invention requires the execution of a cold-start sequence before the modem connection may be re-established.

One alternative example embodiment comprising the present invention is an integrated warm-start mechanism. Where the warm-start selection alternative method chooses between execution of a warm-start sequence and a cold-start sequence, the integrated warm-start process determines the extent to which the modem start-up process needs to reevaluate line conditions. In this alternative example embodiment, the process still takes a line condition measurement after a modem connection is terminated, but augments this measurement step by saving any coefficients that the modem was using to compensate for line conditions. This process then waits until the modem connection needs to be re-established.

When the modem connection needs to be re-established, this alternative method measures the condition of the communications channel at the time the connection needs to be brought back up. If current line conditions are intolerably different than acceptable for a warm-start, the modem executes a training sequence and creates new coefficients that allow the modem to compensate for the new condition of the line. If line conditions have not changed more than a given threshold, the integrated warm-start method provides that the originally saved coefficients be used to re-establish the modem connection. In some embodiments of this alternative method, the initial coefficients may be adjusted to accommodate minor variations in line conditions.

Line condition can be measured in different ways. In one example embodiment of the present invention, the condition of a communications channel is determined by measuring the noise present at the receive-end of a connection. In another example embodiment, line condition is characterized as an echo-path-model depicting echo feedback on the communications line. In yet another embodiment, the spectral response of the communications channel is attributed to line condition.

Both of the primary example embodiments of a method according to the present invention can exploit similar line condition measurement techniques. In one example embodiment, both the warm-start selection and integrated warm-start methods can measure communications channel condition in terms of noise by first monitoring the noise present on the channel and performing a spectral analysis of that noise profile. The spectral analysis may result in a frequency domain profile of the noise.

Where either of the two illustrative embodiments comprising the present invention measure channel condition by creating an echo-path-model for the line, a local modem transmits a probing signal to a remote modem using a send-path. By monitoring the receive-path of the communications channel, the local modem can determine the echo-path-model. Typically, the echo-path-model is represented by an impulse response for a remnant of a probing signal transmitted on the send path of a communication channel and received on the receive path of that same channel.

Both the warm-start selection method and the integrated warm-start method can measure communications channel condition by determining the spectral response of the line. According to these illustrative examples, this is done by sending a probing signal to a remote modem. The remote modem then measures the magnitude of the probing signal in order to characterize the response of the send-path. Characterizing the receive-path by the method of the present invention may require transmission of a probing signal by the remote modem so that the local modem can create a response profile by measuring the signal transmitted by the remote modem.

The present invention further comprises a modem that incorporates the methods of the present invention. In one example embodiment, a modem comprises a demodulator, program memory, operating random access memory (RAM), a warm-start selection instruction sequence stored in the program memory, a warm-start instruction sequence and a cold-start instruction sequence that are also both stored in the program memory. This example embodiment of a modem according to the present invention further comprises a processor for executing the instruction sequences stored in the program memory.

In this example embodiment, the processor executes the warm-start selection instruction sequence. The executing instruction sequence causes the condition of the communications channel to be measured when a modem connection is terminated. An indicator of initial communications channel condition is stored in the operating RAM. Periodically, as driven by a timer loop, the warm-start selection instruction sequence takes new condition measurements for the communications line and stores the most recent condition measurement in the operating RAM.

When a modem connection needs to be re-established, the warm-start selection instruction sequence retrieves the initial condition indicator from the operating RAM and compares that to the most recent channel condition measurement. If the difference between the initial channel condition and the current channel condition exceeds a threshold value, the warm-start selection instruction sequence causes the processor to execute the cold-start sequence stored in the program memory. If the threshold is not exceeded, the warm-start selection instruction sequence causes the processor to execute the warm-start instruction sequence stored in the program memory.

In an alternative example embodiment, a modem according to the present invention again comprises a demodulator, program memory, and operating RAM. In this example embodiment, the modem further comprises a processor for executing instruction sequences stored in the program memory. Further comprising this alternative embodiment is an integrated warm-start instruction sequence. When executed by the processor, the integrated warm-start instruction sequence measures the condition of the communications channel connected to the demodulator and stores that as an initial condition indicator in the operating RAM. The integrated warm-start instruction sequence then saves all coefficients used to describe the condition of the communications channel in the operating RAM.

As the integrated warm-start instruction sequence continues to operate, it waits until the modem connection needs to be re-established. When the modem connection needs to be re-established, the integrated warm-start instruction sequence takes a measurement of current communications channel condition. If the difference in initial and current condition does not exceeds a threshold value, the integrated warm-start instruction sequence recalls the coefficients from the operating RAM and uses those to re-establish the modem connection. If the difference in channel condition exceeds the threshold value, the integrated warm-start instruction sequence enters a training state in order to characterize the communications channel and then develops new descriptive coefficients for the channel. A modem built according to this illustrative embodiment establishes a modem connection using the original or new descriptive coefficients depending on the amount of difference between the original and current channel condition. In some embodiments, the integrated warm-start instruction sequence may adjust the original coefficients if line conditions fall within the threshold and minor condition changes need to be accommodated.

In the two example modem embodiments that comprise the present invention, characterizing or measuring line condition can be accomplished in several ways. Three types of line condition metrics comprise the present invention, but the invention should not be limited to the use of these three techniques. First, line condition may be ascertained by monitoring the noise present on a communications channel. In another example technique, line condition is represented in terms of an echo-path-model for the communications channel. In another example embodiment of modem built in accordance with the present invention, the spectral response of the communications channel may be used to represent channel condition.

In either example modem embodiment that comprises a means to depict line condition in terms of noise, the modem may further comprise a sampling unit that digitizes the signal level of the communications channel and a spectrum analyzer instruction sequence stored in the program memory. The spectrum analyzer instruction sequence accepts as input a plurality of magnitude values. In operation, these values are obtained from the sampling unit. The result of executing the spectrum analyzer instruction sequence is a plurality of magnitude values for a plurality of frequency stops; i.e. a frequency domain representation of the noise. This frequency domain representation of the noise is stored in the operating RAM as representative of initial or current channel noise.

In either example modem embodiment, communications channel condition may be depicted as an echo-path-model. One embodiment of the invention comprises a modem further comprising a signal generator that is capable of injecting a probing signal into the send-path of the communications channel and a sampling unit that is capable of digitizing the signal level present on the receive-path of the same channel. In this example embodiment, an echo-sampler instruction sequence is stored in program memory and executed by the processor. As the echo-sampler instruction sequence executes, it commands the signal generator to inject a probing signal into the communication channel's send-path. The echo-sampler instruction sequence obtains a series of magnitude samples from the sampling unit and generates coefficients that represent an impulse response of a remnant of the probing signal that may be received on the receive path of the channel.

In those example modem embodiments that comprise a capability to measure channel condition in terms of a spectral response, two measurement configurations may be required; one for determining the spectral response on the send-path of the communications channel and another configuration for characterizing the spectral response of the receive-path of a communications channel.

In the first configuration, characterizing the send-path requires that the modem further comprise a signal generator capable of injecting a probing signal into the send-path of the communications channel. This example embodiment further comprises a spectral response instruction sequence that is stored in the program memory. As the spectral response instruction sequence is executed by the processor, it commands the signal generator to inject a probing signal into the communication channel send-path. The spectral response instruction sequence sends a command to a remote modem causing the remote modem to measure the probing signal. This enables the remote modem to characterize the spectral response of the send-path.

In the second configuration, one example embodiment of a modem according to the present invention further comprises a sampling unit capable of digitizing the signal level of the receive-path of a communications channel. Further comprising the modem of this illustrative example is a spectral response instruction sequence and a spectrum analyzer instruction sequence, both of which are stored in the program memory. As the spectral response instruction sequence is executed by the processor, it commands a remote signal source to transmit a probing signal. This signal is received by the local modem on the receive-path. The spectral response instruction sequence obtains a series of magnitude samples from the sampling unit and causes the processor to execute the spectrum analyzer instruction sequence. The resultant frequency domain representation of magnitude and phase versus frequency depicts the spectral response of the receive-channel.

BRIEF DESCRIPTION OF THE DRAWINGS

The foregoing aspects are better understood from the following detailed description of one embodiment of the invention with reference to the drawings, in which.

DETAILED DESCRIPTION OF THE INVENTION

Figure 1:
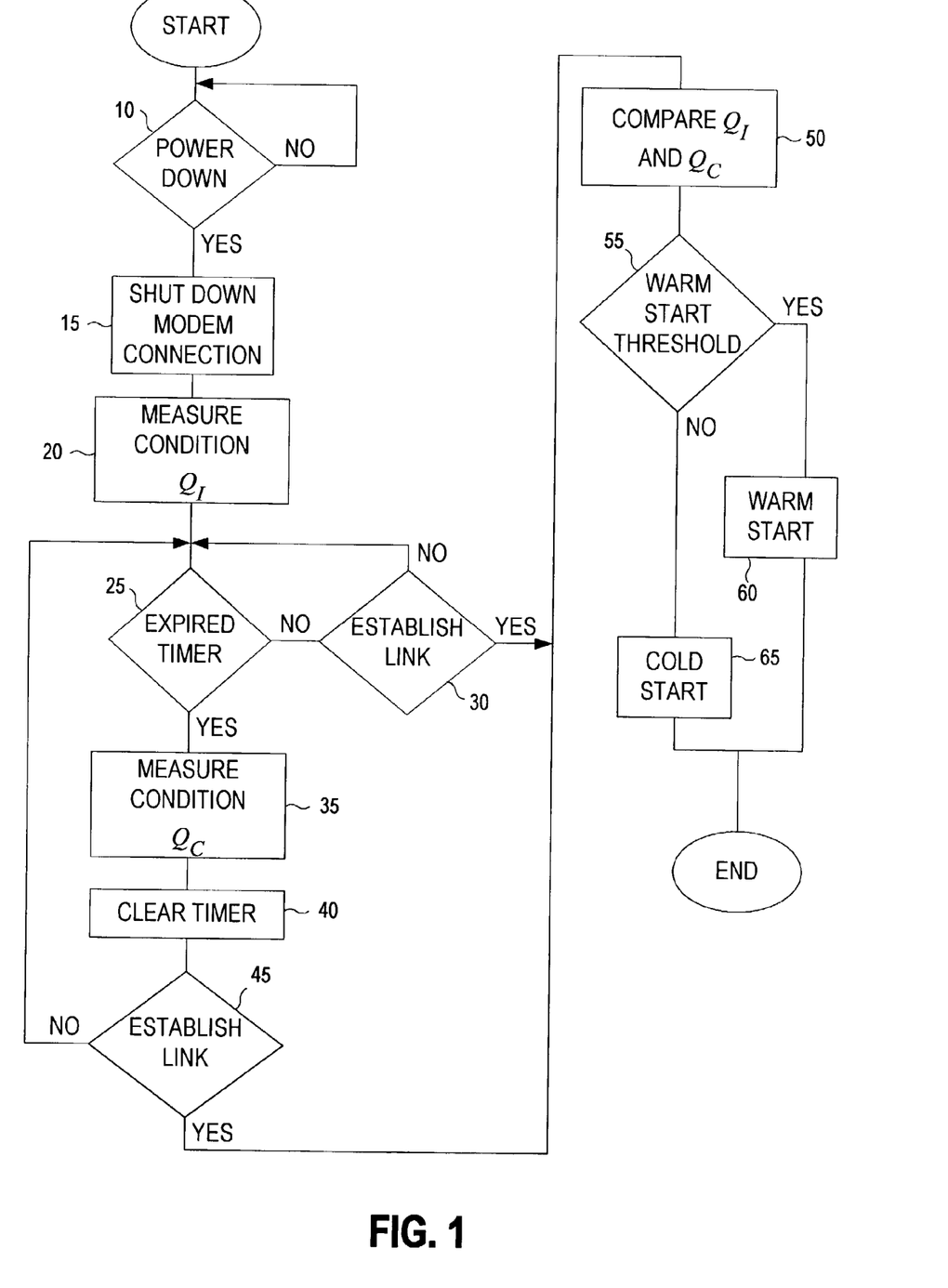
FIG. 1 is a flow diagram that depicts one illustrative embodiment of a method for intelligent selection of a warm-start sequence in modems.

FIG. 1 is a flow diagram that depicts one illustrative embodiment of a method for intelligent selection of a warm-start sequence in modems. According to this illustrative embodiment, a modem must first determine if a power-down or reduced-power state needs to be entered (step 10). In some applications, the need to enter a power-down state may be driven by the need to reduce modem power consumption and heat generation or to reduce emission of electromagnetic interference.

Once the modem determines that a power-down state should be entered, the modem shuts down the modem connection (step 15). Immediately after the modem connection is terminated, the modem measures the condition of the communications line (step 20). This condition measurement is then stored and is referred to as the initial condition $Q_I$.

During the power-down state, the modem periodically samples the condition of the communications line. This is accomplished by setting a timer and then waiting for the timer to expire (step 25). When the timer expires, the modem takes a current line condition measurement, $Q_C$ (step 35). Once the current condition measurement is made, the timer is cleared (step 40) and the modem again waits for the timer to expire so that a new line condition measurement can be made.

Within this timer loop, the modem also checks to see if the modem connection needs to be re-established. If this is the case (step 30), the modem immediately compares the current line condition $Q_C$ with the initial condition $Q_I$ as measured immediately after the connection was severed (step 50). Note that the illustrative method described here also provides for determination of connection re-establishment immediately after clearing the timer (step 45).

After the initial condition measurement is compared with current line conditions, the modem compares the variation in line condition to a threshold value (step 55). If the threshold is exceeded, the modem performs a complete cold-start sequence (step 65). If the change in line conditions has not exceeded this variation threshold, the modem performs a warm-start sequence. It goes without saying that if the warm-start can be performed instead of the cold-start, the delay in re-establishing the communications link could be reduced significantly. The variation threshold may be determined either analytically or empirically for various types of line condition metrics.

Figure 2A:
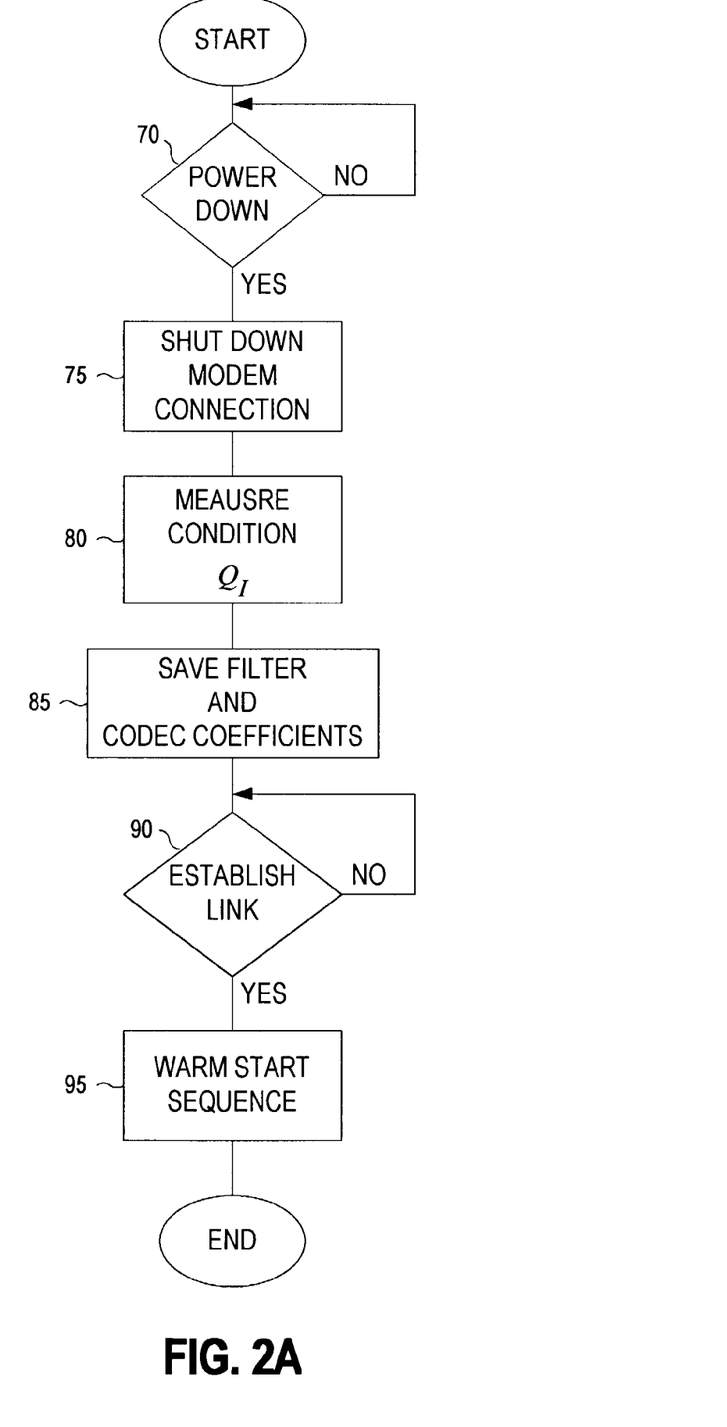
FIGS. 2A and 2B comprise a flow diagram depicting a second illustrative embodiment of an integrated warm start sequence according to the present invention.
Figure 2B:
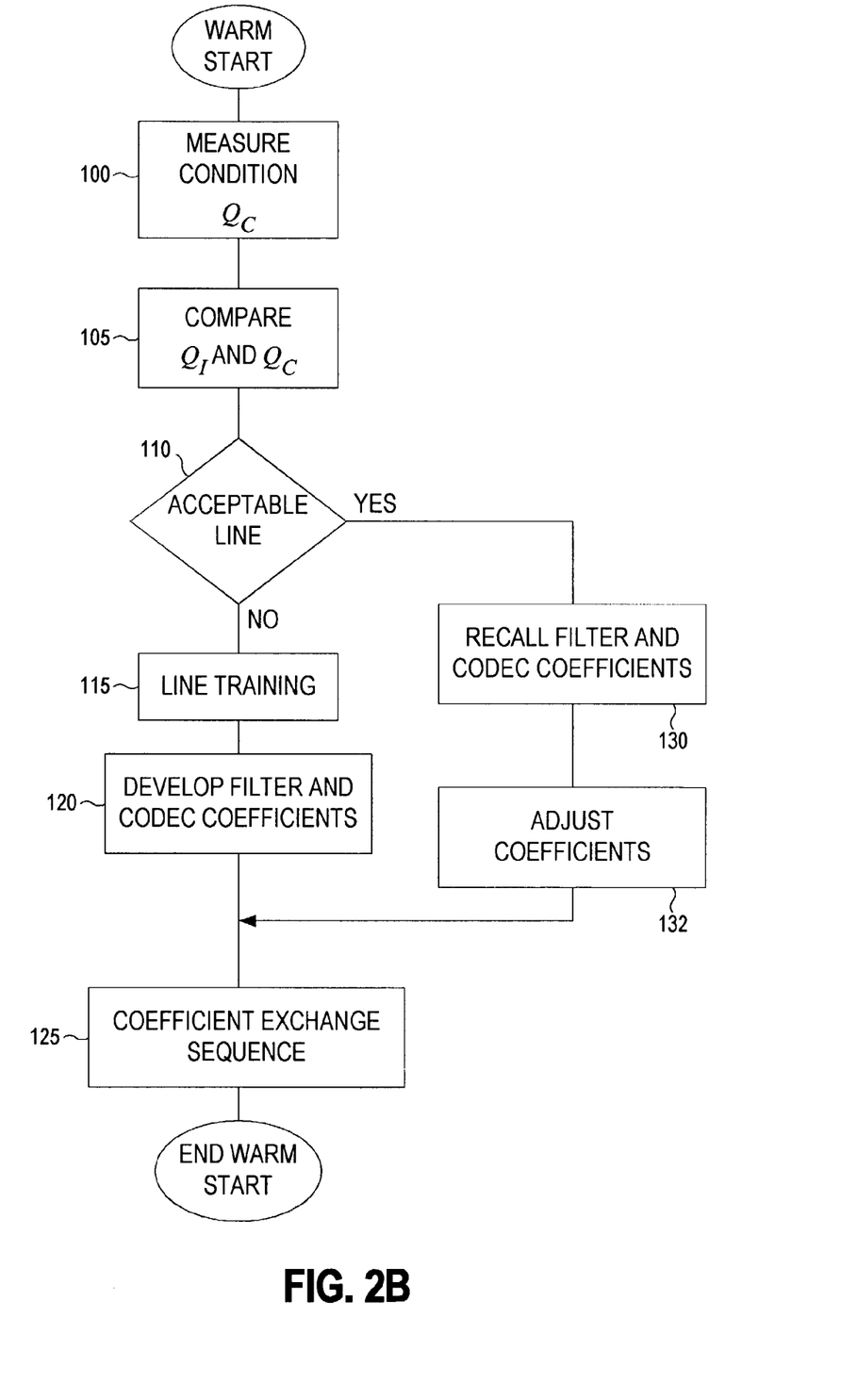

FIGS. 2A and 2B comprise a flow diagram depicting a second illustrative embodiment of an integrated warm start sequence according to the present invention. As in the first embodiment described supra, the modem must first determine if a power-down state is in order (step 70). Given that the modem is to terminate the communications link, the modem shuts down the connection (step 75).

In this alterative embodiment, the modem takes an initial line condition sample (step 80) and saves it as $Q_I$. The condition of the line is normally expressed through a series of coefficients for various filters and coder/decoders ("codec"). These filter and codec coefficients may be saved for later use (step 85). In some embodiments, an initial condition sample may be taken when the modem first starts up. This may be beneficial where all or some parameters are frozen at the end of initial cold-start and are not adapted to changing line conditions. This may also be beneficial when warm-start should only be used when it maintains sufficiently high margin, relative to initial conditions.

In contrast to the first described embodiment, the method of this second example implementation does not provide for periodic checks of line condition. Rather, this method will execute an integrated warm-start sequence (step 95), but only when the communications link needs to be re-established (step 90).

The integrated warm-start sequence begins by taking a current condition measurement for the communications line (step 100). The current condition, $Q_C$, is compared to the initial condition, $Q_I$, of the communications channel stored when the modem connection was shut down (step 105).

If the variation between the initial line condition and the current line condition is not excessive, the line is declared to be acceptable (step 110). It should be noted that the amount of variation that is acceptable may be determined either empirically or analytically. In one illustrative case, the method provides that the filter and codec coefficients should be retrieved from storage (step 130) and used to start up the communications link again. In some embodiments of this method, some or all of the coefficients may need adjustment to account for minor changes in channel condition (step 132).

If the conditions of the communications line are found to be intolerably different from those existing when the communications link was terminated, this example method of the present invention provides for training of the modem (step 115) and subsequent creation of new filter and codec coefficients (step 120). In either of these cases, i.e. with or without the training steps, this illustrative method for an integrated warm-start sequence provides that the filter and codec coefficients be optionally exchanged with the modem on the other end of the link (step 125).

In both of these illustrative embodiments, current line condition is compared to an initial state as measured on the communications line. One important aspect of the present invention is the comparison of initial and current line conditions. In each step described herein, the sampling of the condition of the line may be any combination of noise measurement, determination of the echo-path-model for the communications system, or determination of equalization coefficients for the communications system. Other metrics for characterizing line condition may also be used where required for special applications or line conditions and the scope of the present invention is not intended to be limited by the type of line condition metric applied in the method comprising the invention.

Figure 3:
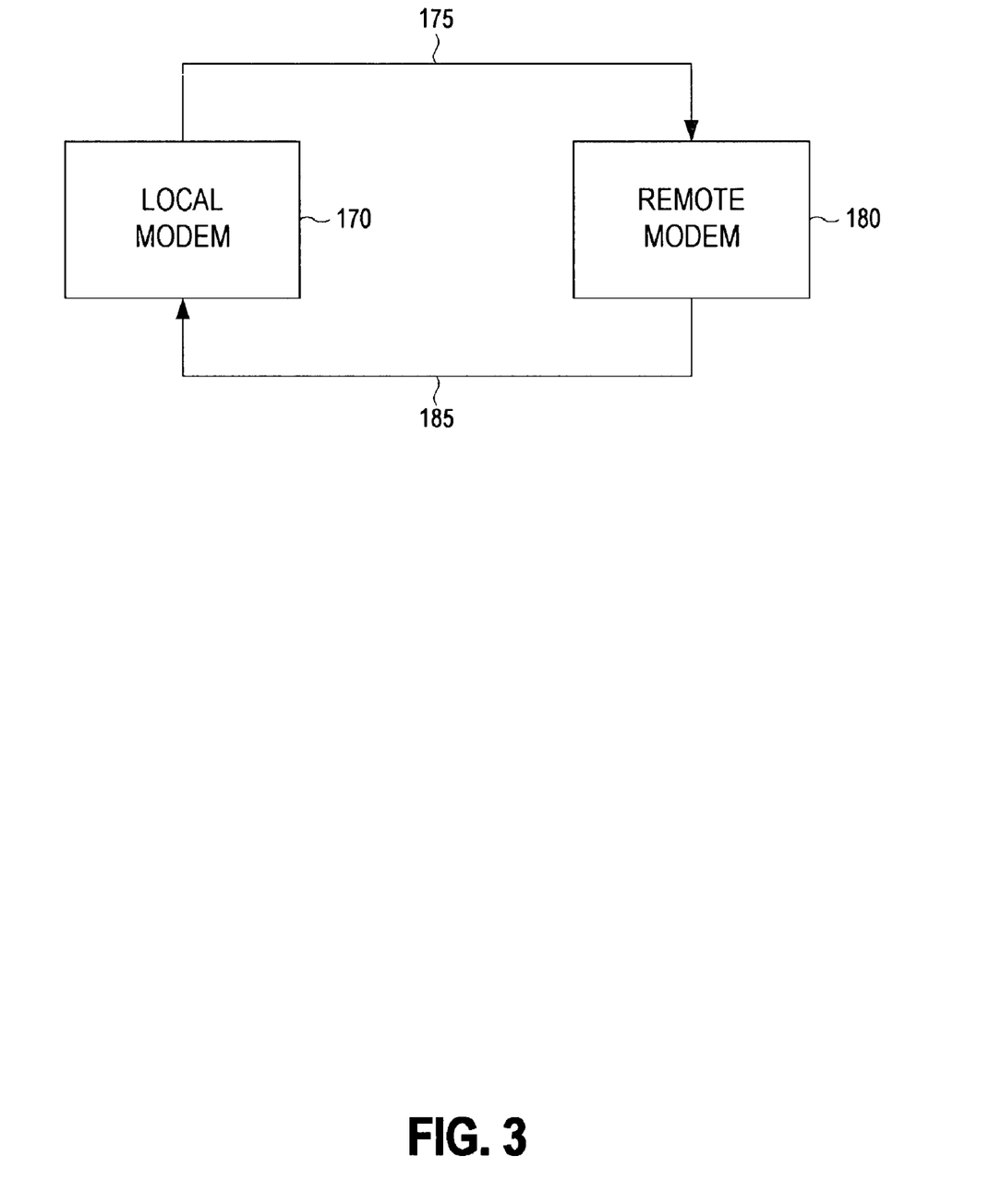
FIG. 3 is a block diagram that depicts the connection of a local modem to a remote modem using a send-path and a return-path.
Figure 4:
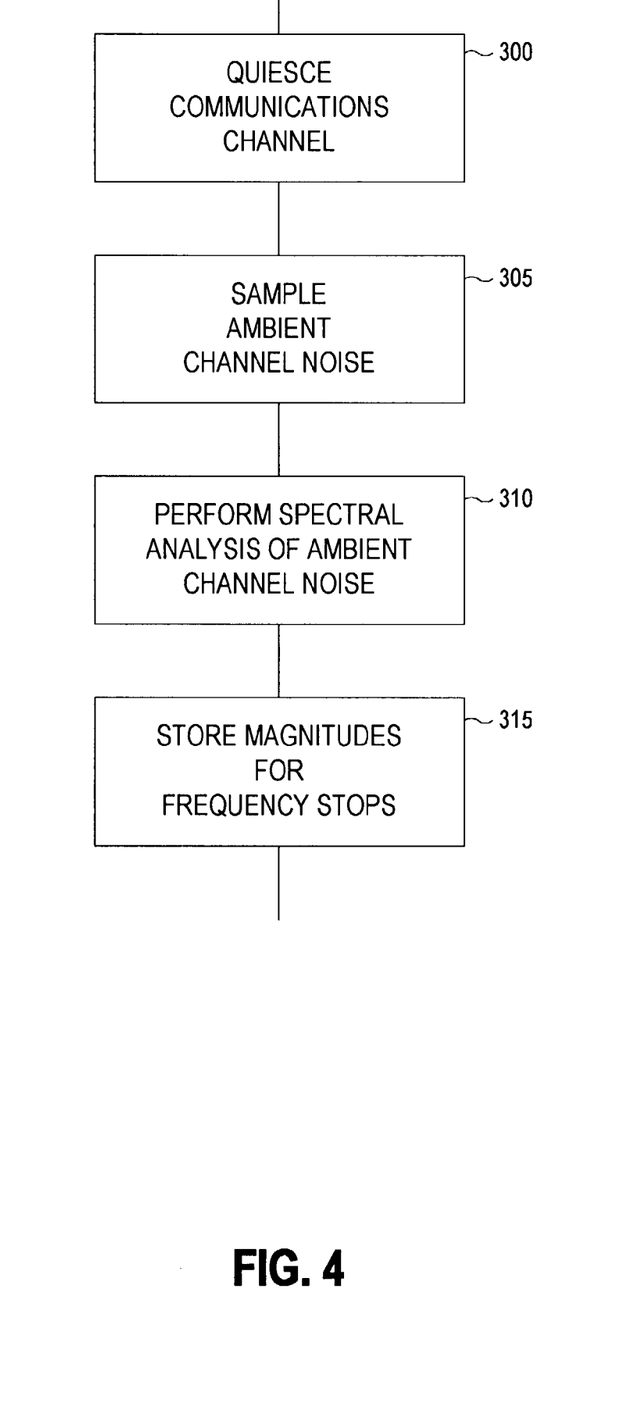
FIG. 4 is a flow diagram that depicts one example embodiment of the method of the present invention for measuring condition in terms of ambient noise.

FIG. 3 is a block diagram that depicts the connection of a local modem to a remote modem using a send-path and a return-path. FIG. 4 is a flow diagram that depicts one example embodiment of the method of the present invention for measuring line condition in terms of channel noise. As already indicated, the present invention may further comprise a method for measuring the condition of the communication channel in terms of the channel noise present on the communications channel.

In this example embodiment, a local modem 170 uses the modem connection to connect to a remote modem 180. Once the modem connection is terminated (step 300), the local modem 170 may sample the channel noise present on the receive-path 185. This sampling results in a time domain representation of the noise on the channel. The local modem determines the spectral composition of the noise (step 310) and stores the results for later use (step 315). The spectral composition of the noise is represented in the frequency domain. The same technique, as described infra, is used for both the initial and current condition of the communications channel.

In one illustrative embodiment, noise is measured by sampling the signal present on the receive-path 185 and then performing a spectral analysis on the signal. The spectral analysis results in a plurality of magnitude values for each of a plurality of frequency stops. These magnitudes are then stored as either initial or current noise indicators of line condition. This may be accomplished by way of a Discrete Fourier Transform.

Figure 5:
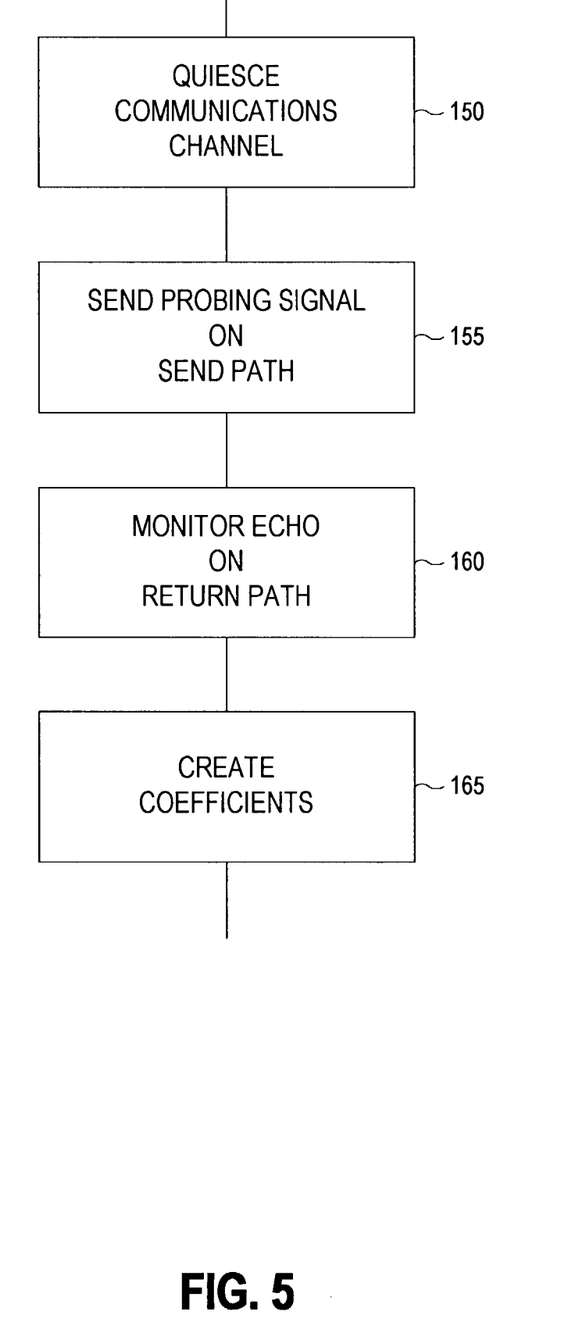
FIG. 5 is a flow diagram of one example embodiment of the present invention that shows the process of establishing an echo-path-model for the communications line.

FIG. 5 is a flow diagram of one example embodiment of the present invention that shows the process of establishing an echo-path-model for a communications channel. Again in light of FIG. 3, the method of the present invention may measure communication line conditions by determining the echo-path-model for the communications channel under both initial and current conditions.

One illustrative method of determining the echo-path-model comprises the step of quieting the communications channel (step 150). Once the communications channel is in a quiescent state, a local modem 170 sends a probing signal to a remote modem 180 (step 155). The probing signal is transmitted to the remote modem 180 using a send-path 175. A remnant of the probing signal may be reflected back into the return-path 185 that is otherwise used to receive a modulated signal from the remote modem 180. The local modem 170 measures the remnant signal that is received on the return-path 185 in order to determine the echo-path-model of the entire communications channel (step 160). The echo-path-model is typically represented in terms of an impulse response comprising amplitude values and delay values.

It should be noted that in some embodiments the probing signal sent to the remote modem might comprise a plurality of carriers at various frequencies within the band used by the modems for data communications. In an alternative embodiment, the local modem 170 may send a spectrum of noise as opposed to a single frequency tone. In a more sophisticated embodiment of this method, the probing signal may comprise a periodic "m-sequence". In this case, the impulse response of the channel may be determined based on the cross-correlation of the echo and one period of the periodic m-sequence.

Figure 6:
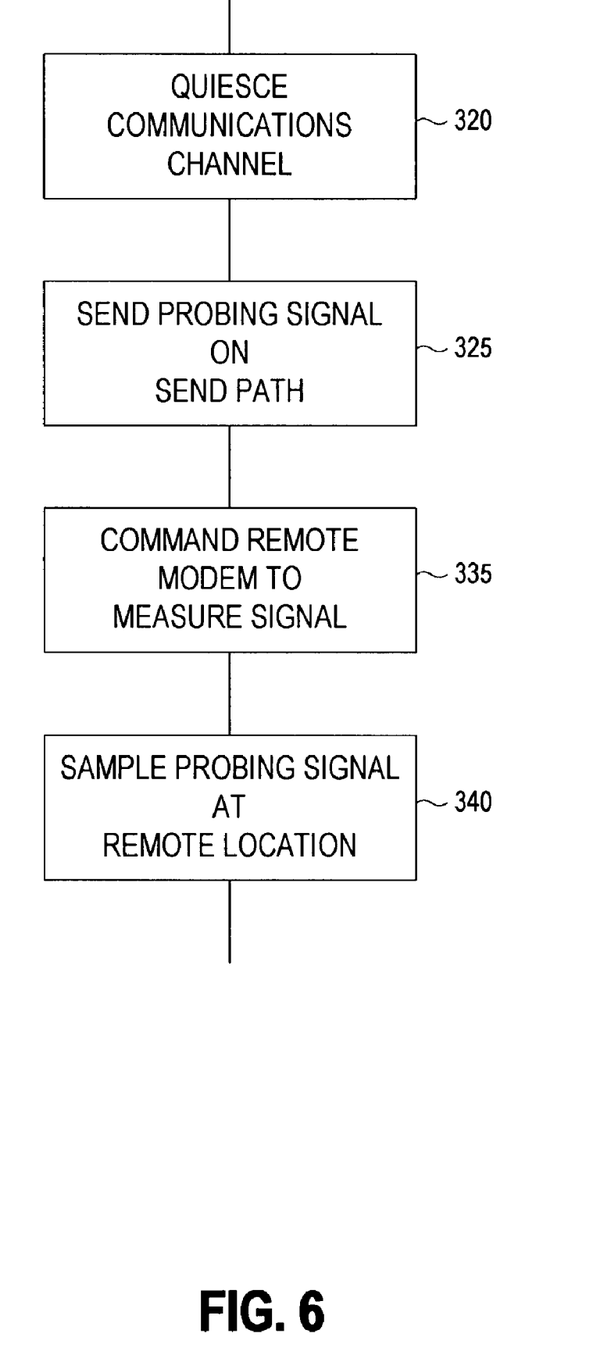
FIG. 6 is a flow diagram that depicts one example embodiment of a process according to the present invention for conducting equalization of a communications channel.

FIG. 6 is a flow diagram that depicts one example embodiment of a process according to the present invention for determining the spectral response of a communications channel. In this illustrative embodiment, the local modem 170 first ensures that the communications line is quite (step 320). With the communication line quite, the local modem sends a probing signal to the remote modem 180 (step 325). While the probing signal is on the communication line, the local modem 170 may command the remote modem (step 335) to measure the spectral density of the probing signal.

When the remote modem 180 receives the measurement command from the local modem 170, the remote modem 180 will sample the probing signal (step 340). In some embodiments of the present method, the probing signal may be a periodic m-sequence. In this case, the impulse response of the channel may be determined based on the cross-correlation of the received signal and one period of the periodic m-sequence.

In another example embodiment, the process of the claimed invention is modified in order to characterize the spectral response of the receive-path 185 of the communications channel. In this modified process, the remote modem 180 is commanded to send a probing signal to the local modem 170. When the probing signal arrives on the receive-path 185, the local modem measures the signal in order to characterize the spectral response of the receive path.

Figure 7:
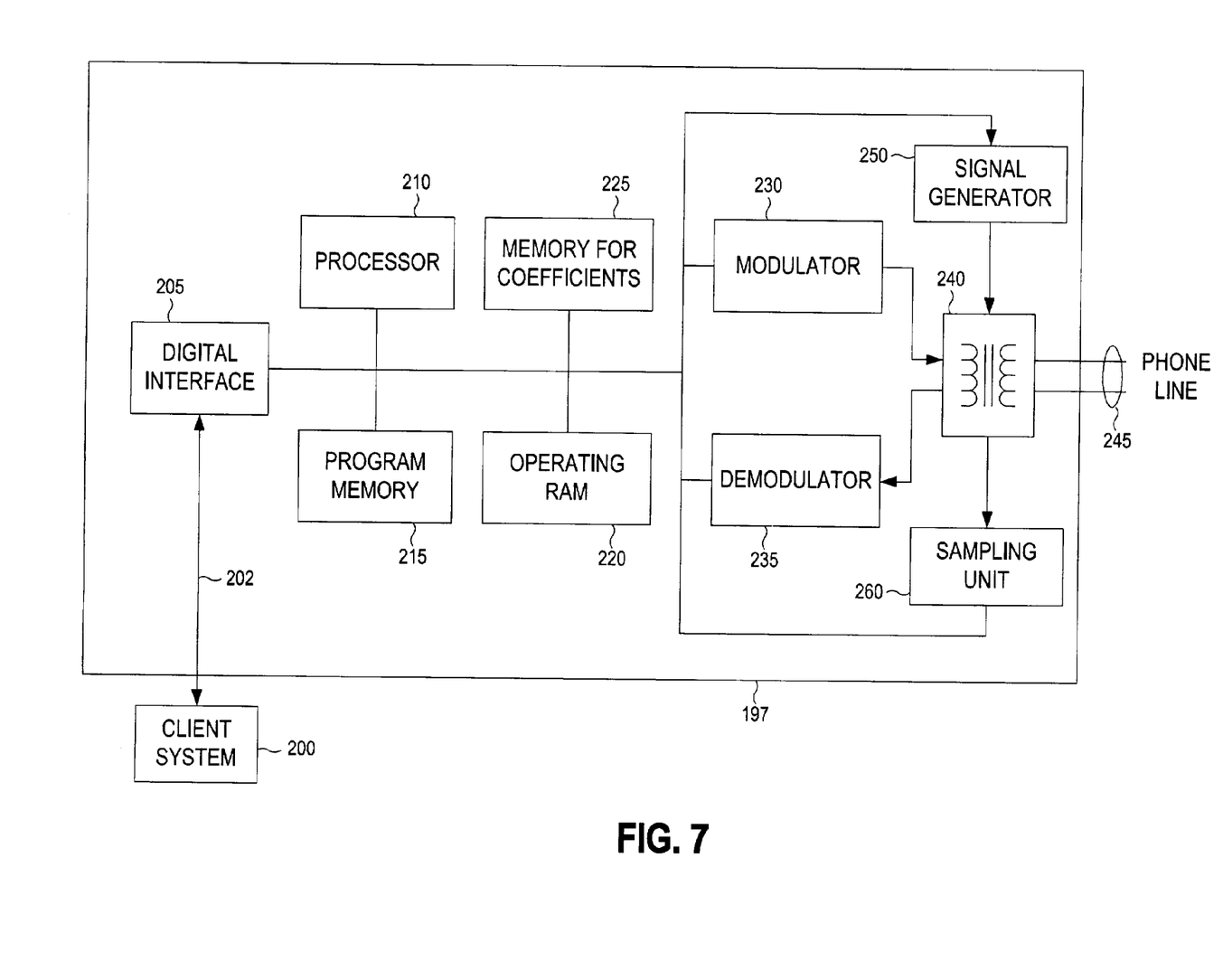
FIG. 7 is an illustrative block diagram of a modem that incorporates an intelligent warm-start capability according to the present invention.

FIG. 7 is an illustrative block diagram of a modem that incorporates an intelligent warm-start capability according to the present invention. According to this example embodiment of the present invention, a modem 197 comprises a digital interface 205 that enables communications with a client system 200. It should be noted that the digital interface may comprise a network interface for connection to a local area network, or it may comprise a serial interface that connects the modem to the client system 200 by way of a point-to-point serial interface. The nature of the physical interface from the modem 197 to the client system 200 is not intended to limit the scope of the present invention in any manner.

Considering further the example embodiment of the modem 197, a processor 210 further comprises the modem 197 along with a program memory 215 and an operating random access memory (RAM) 220. The modem 197 may further comprise a demodulator 235. The modem may also further comprise a modulator 230. The modulator 230 and the demodulator 235 are coupled together through a hybrid circuit and with a transformer 240 that connects these elements to a telephone line 245. The modem 197 may further comprise a memory for the storage of filter and codec coefficients 225.

The invention should not be limited in scope to the use of any particular type of modulator or demodulator, nor should the invention be limited to the use of any particular processor or memory components. Interface of the modem 197 to a telephone line 245 is for illustrative purposes only; the teachings of the present invention can be applied to any physical communications medium. Example modulation and demodulation techniques that may be used include, but should not necessarily be limited to amplitude modulation, frequency modulation, phase-shift-keying, bi-phase modulation and quadrature amplitude modulation. DMT modulation may also be used and carrierless amplitude and phase (i.e. CAP) modulation may also be used.

In operation, the modem receives digital information from the client system 200. This information is routed through a client interface 202 and is received into the modem 197 using the digital interface 205. The processor 210 executes a sequence of instruction stored in the program memory 215. This sequence of instructions causes the processor 210 to propagate the digital information from the digital interface 205 through to the modulator 230. The modulator imparts the digital information onto a carrier and conveys the carrier to the transformer 240 thereby sending the carrier outward onto the telephone line 245.

Receiving digital information from a remote modem is performed in a manner analogous to transmission. An inbound modulated carrier arrives by the phone line 245 and is propagated by the transformer 240 to the demodulator 235. The demodulator extracts the digital information from the carrier. The processor 210, again by executing a sequence of instructions stored in the program memory 215, directs the information from the demodulator 235 to the digital interface 205. The digital interface 205 directs the incoming information to the client system 200.

In an illustrative embodiment of a modem that comprises an intelligent selection of a warm start sequence in deference to a cold start sequence, the processor 210 executes a sequence of instructions called the "warm-start preference" sequence stored in program memory 215 and further comprising the invention.

The warm-start preference sequence first determines if an existing modem channel needs to be terminated. In this event, the processor 210, by means of the warm-start preference instruction sequence, shuts down the modem connection and takes a measurement of communications channel condition. The result of the line condition measurement is stored in the operating RAM 220. The warm-start preference sequence further comprises a sequence of instructions called the "timer". The processor 210 executes the timer sequence. When the timer expires, the processor 210 measures the condition of the communications line. The current condition of the communications line $Q_C$ is stored in the operating RAM 220. The warm-start preference sequence provides for clearing the timer and then checking whether a new communications link needs to be established. If there is no call for a new communications channel, the warm-start preference sequence again waits for the expiration of the timer and a takes a new measurement of current line condition.

When the processor 210, through execution of the warm-start preference sequence, determines that a new communications link needs to be established, the warm-start preference sequence drops out of the timer loop. The warm-start preference sequence causes the most recently obtained line condition indicator for the communications line $Q_C$ to be compared with the initial line condition indicator $Q_I$. The warm-start preference sequence that is stored in the program memory 215 retrieves a warm-start threshold from the operation RAM 220. This warm-start threshold defines the maximum allowable variation between the current line condition $Q_C$ and the initial line condition $Q_I$. If the variation in line condition does not exceed this threshold, the warm-start preference sequence provides that a warm-start be performed in lieu of the cold-start. Otherwise a cold-start is performed. This is accomplished by executing either a warm-start instruction sequence or a cold-start instruction sequence, both of which may be stored in program memory and further comprise the invention. The variation threshold may be determined analytically or empirically.

In one alternative example embodiment of the modem, capability to intelligently select between a warm-start and a cold-start is supplanted by an integrated warm-start capability. One example embodiment of a modem 197 that comprises this integrated warm-start capability comprises a sequence of instructions stored in the program memory 215 called the "integrated warm-start sequence". The integrated warm-start sequence first determines if an existing modem connection needs to be terminated. In this event, the integrated warm-start sequence provides for the termination of the existing modem connection. This step is immediately followed by sampling the communications channel in order to determine the condition of the channel. This sampling represents the initial condition of the channel, $Q_I$, and is stored in the operating RAM 220. In addition to sampling the initial condition of the communications channel, the integrated warm-start sequence executed by the processor 210 saves existing filter and codec coefficients in the coefficient memory 225.

The integrated warm-start sequence waits until the modem connection needs to be re-established. When the modem connection needs to be re-established, the integrated warm-start sequence executed by the processor 210 samples the current condition of the communications channel $Q_C$. The integrated warm-start sequence executed by the processor 210 compares the current condition of the communications channel $Q_C$ to the initial condition of the communications channel $Q_I$ that was stored in the operating RAM 220 immediately after the modem connection with terminated. If the variation between the initial condition $Q_I$ and the current condition $Q_C$ is greater than a first predetermined threshold, the integrated warm-start sequence provides that the communications channel is no longer acceptable. In this event, the processor 210 will execute a sequence of instructions for determining the new condition of the communications line and a sequence of instructions for creating new filter and codec coefficients indicative of current line condition. These two additional instructions sequences further comprise the integrated warm-start sequence executed by the processor 210.

In some embodiments of a modem according to the present invention, the processor 210 may execute an instruction sequence called "coefficient adjustment". The coefficient adjustment instruction sequence may be executed if the difference between the current line condition and the initial line condition indicators stored in the operating RAM 220 does not exceed a second variation threshold. The coefficient adjustment sequence may cause some or all of the coefficients to be modified to account for minor variation in line condition relative to the initial condition of the communications channel. The variation threshold in this alternative embodiment of the invention may be developed analytically or empirically.

For either of these two example embodiments, i.e. intelligently selecting between a warm-start sequence and a cold-start sequence or an integrated warm-start sequence, the condition of the communications channel can be determined in a number of ways. In one example embodiment, communications channel condition may be determined by measuring the channel noise perceived by the demodulator 235. In another example embodiment, line condition may be represented by an echo-path-model for the communications system. In yet another example embodiment, line condition may be determined by measuring the spectral response of the communications medium. Any or all of these techniques may be used individually or in any combination to determine the condition of the communications channel. Other techniques for measuring the condition of the communications line can also be used as necessary to support special applications and the scope of the present invention should not be limited to embodiments incorporating the techniques described herein.

One example embodiment where the modem 197 comprises the capability for measuring the noise perceived by the demodulator 235, the modem 197 further comprises a sampling unit 260. The sampling unit 260 samples the magnitude of the receive-path that feeds the demodulator 235. In this example embodiment, a sequence of instructions called "spectrum analyzer" is stored in the program memory 215 and further comprises the invention. In some embodiments, the spectrum analyzer instruction sequence may implement a discrete Fourier transform function.

The processor 210 executes the spectrum analyzer sequence. Before executing the spectrum analyzer sequence, the processor 210 is able to receive a series of magnitude samples from the sampling unit 260. By applying known signal processing methods, execution of the spectrum analyzer sequence results in a plurality of magnitude values for each of a plurality of frequency stops. This profile represents the channel noise present at the input of the demodulator 235. This noise profile may serve as one indicator of communications channel line condition. The initial channel noise profile may be generated immediately after the modem channel is terminated. The initial channel noise profile may then be compared against the channel noise present on the communications channel prior to re-establishing a modem connection.

In some embodiments of a modem 197 according to the present invention, the modem may comprise a "probe signal generator". The probe signal generator may either be a hardware element 250 or an instruction sequence that may be stored in the program memory 215. The probe signal generator may be invoked in order to dispatch a probing signal outward from the modem 197. In one alternative embodiment, a modem 197 according to the present invention may further comprise a probe signal generator comprising a probe generator instruction sequence stored in the program memory 215. The probe generator instruction sequence typically causes the modulator 230 to generate a probing signal that is propagated outward from the modem 197. In one illustrative embodiment, the probing signal may be a periodic m-sequence.

In one example embodiment, the modem 197 may further comprise an instruction sequence called "echo sampler" that is typically stored in the program memory 215 and a sampling unit 260. The echo sampler instruction sequence causes the sampling unit 260 to measure any remnant of a probing signal that may have been generated by the probe signal generator. The echo analysis instruction sequence may result in an impulse response indicative of the echo path. This impulse response may comprise a spectral density and delay for the remnant signal as a function of the probing signal.

In a modem constructed according to the teachings of the present invention that is capable of measuring the spectral response of a communications channel, the invention may further comprise a "spectral response" instruction sequence that may be stored in program memory and a probe signal generator. The spectral response instruction sequence may cause the probe signal generator to send a probing signal to a remote modem. The probing signal may be a periodic m-sequence. This enables the spectral profile of a send-channel comprising the communications channel to be determined. This is typically accomplished by commanding the remote modem to execute a spectrum analyzer instruction sequence so that the spectral profile may be represented in the frequency domain.

In another embodiment, a modem 197 may further comprise a spectral response instruction sequence that is stored in the program memory 215 and a sampling unit 260. Upon execution by the processor 210, the spectral response instruction sequence requests a remote modem to transmit a probing signal. The probing signal may be a periodic m-sequence.

In order to characterize the condition of the receive path, the spectral response instruction sequence is executed by the processor 210 and causes the sampling unit to provide a plurality of digital samples of the signal level present on the receive path of the communications channel. The spectral response instruction sequence may then cause the processor to execute a spectrum analyzer instruction sequence that may further comprise the invention and is typically stored in the program memory 215. The spectrum analyzer instruction sequence generates a plurality of magnitude values for a plurality of frequency stops. These values may be stored in the operating RAM 220 as an indicator of the spectral response of the receive path comprising the communications channel.

Alternative Embodiments

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents.

What is claimed is:

1. A method for intelligent selection of a warm start in a modem comprising the steps of:

terminating a modem connection once the need to terminate the modem connection has been recognized;

capturing an initial condition of a communications channel that carried the modem connection and storing same as a profile of an initial profile of channel condition;

setting a timer; and waiting for the timer to expire and while the timer has not yet expired, determining if the modem connection needs to be re-established;

if the timer has expired and there is no need to re-establish the modem connection:

capturing a current condition of the communications channel and storing same as a profile of current channel condition; and resetting the timer; and if the modem connection needs to be re-established:

retrieving the initial profile of channel condition from storage;

retrieving the current profile of channel condition from storage;

initiating a warm-start sequence if the difference between the initial profile of channel condition and the current profile of channel condition does not exceed a variation threshold; and initiating a cold-start sequence if the difference between the initial profile of channel condition and the current profile of channel condition exceeds the variation threshold.

2. The method of claim 1 wherein the steps of capturing the initial profile of channel condition and the profile of current channel condition, comprise measuring the noise present on communications channel.

3. The method of claim 2 wherein measuring the noise on the communications channel comprises the steps of:

performing a special analysis of the noise present on the communications channel; and storing the results of the spectral analysis.

4. The method of claim 1 wherein the steps of capturing the initial profile of channel condition and the profile of current channel condition, comprise determining an echo-path-model for the communications channel.

5. The method of claim 4 wherein determining the echo-path-model for the communications channel comprises the steps of:

transmitting a probing signal to a remote modem using a send-path;

capturing a remnant of the probing signal received on a receive-path; and creating coefficients that describe an impulse response of the remnant of the probing signal received on the receive-path as a function of the probing signal transmitted on the send-path.

6. The method of claim 1 wherein the steps of capturing the initial profile of channel condition and the profile of current channel condition, comprise determining the spectral response of the communications channel.

7. The method of claim 6 wherein the determining the spectral response of the communications channel comprises the steps of:
   transmitting a probing signal to a remote modem using a send-path; and
   commanding the remote modem to measure the spectral density of the probing signal as it is received by the remote modem.

8. The method of claim 6 wherein the determining the spectral response of the communications channel comprises the steps of:
   commanding of a remote signal source to transmit a probing signal; and
   measuring the spectral density of the probing signal as it arrives by a receive-path of the communications channel.

9. An integrated warm-start process for use in a modem channel recovery comprising the steps of:
   terminating a modem connection of a modem once the need to terminate the modem connection has been recognized;
   capturing an initial condition of a communications channel that carried the modem connection and storing same as an initial profile of channel condition of the communications channel;
   saving original coefficients used by the modem to describe the initial condition of the communications channel;
   waiting until the modem connection needs to be re-established;
   if the modem connection needs to be re-established;
      capturing a current profile of channel condition for the communications channel;
   if the current profile of channel condition varies from the initial profile of channel condition by more than a first predetermined threshold:
      training the modem to account for a new line condition;
      developing new coefficients to describe the current profile of channel condition of the communications channel; and
      re-establishing the modem connection using the new coefficients; and
   if the current profile of channel condition does not vary from the initial profile of channel condition by more that the first predetermined threshold:
      recalling the original coefficients; and
      re-establishing the modem connection using the original coefficients.

10. The process of claim 9 further comprising the step of: adjusting the original coefficients to account for minor variations in the new line condition if the current profile of channel condition does not vary from the initial profile of channel condition by more than a second predetermined threshold.

11. The process of claim 9 wherein the steps of capturing the initial profile of channel condition and the profile of current channel condition, comprise measuring noise present on the communications channel.

12. The process of claim 11 wherein measuring the noise on the communications channel comprises the steps of:
   performing a spectral analysis of the noise present on the communications channel; and
   storing the results of the spectral analysis.

13. The process of claim 9 wherein the steps of capturing the initial and current profiles of channel condition comprise determining an echo-path-model for the communications channel.

14. The process of claim 13 wherein determining the echo-path-model for the communications channel comprises the steps of:
   transmitting a probing signal to a remote modem using a send-path;
   capturing a remnant of the probing signal received on a receive-path; and
   creating the new coefficients that describe an impulse response of the remnant of the probing signal received on the receive-path as a function of the probing signal transmitted on the send-path.

15. The process of claim 9 wherein the steps of capturing the initial and current profiles of channel condition comprise. determining a spectral response of the communications channel.

16. The process of claim 15 wherein determining the spectral response of the communications channel comprises the steps of:
   transmitting a probing signal to a remote modem using a send-path; and
   commanding the remote modem to measure the spectral density of the probing signal as it is received by the remote modem.

17. The process of claim 15 wherein determining the spectral response of the communications channel comprises the steps of:
   commanding a remote signal source to transmit a probing signal; and
   measuring the spectral density of the probing signal as it arrives by a receive-path of the communications channel.

18. A modem comprising:
   a demodulator;
   a program memory for storing instruction sequences;
   an operating RAM for storing variables;
   a warm-start preference instruction sequence stored in the program memory;
   a warm-start instruction sequence stored in the program memory; and
   a processor that executes the warm-start preference instruction sequence that minimally:
      causes a condition of a communications channel connected to the demodulator to be captured after having determined that a connection with a remote modem needs to be terminated and stores a captured condition as an initial profile of the communications channel condition in the operating RAM;
      periodically captures the condition of the communications channel connected to the demodulator based on a time loop and stores the communications channel condition as a current profile of the communications channel condition in the operating RAM; and
      if a modem connection needs to be re-established:
         retrieves the initial profile of the communications channel condition from the operating RAM;
         if the difference between the initial profile of the communications channel condition and the current profile of the communications channel condition exceeds a threshold causes the processor to execute a cold-start instruction sequence stored in the program memory; and to execute the cold-start instruction sequence stored in the program memory; and if the difference between the initial profile of the communications channel condition and current profile of the communications channel condition does not exceed the threshold causes the processor to execute the warm-start instruction sequence stored in the program memory.

19. The modem of claim 18 wherein the warm-start preference instruction sequence measures noise present on the communications channel.

20. The modem of claim 19 further comprising:
a sampling unit that creates digital values representative of the signal level present on the communications channel; and
a spectrum analyzer instruction sequence stored in the program memory that minimally creates a plurality of magnitude values at a plurality of frequency stops based on a series of magnitude samples and wherein the warm-start preference instruction sequence minimally measures noise by:
  obtaining the series of magnitude samples from the sampling unit;
  causing the processor to execute the spectrum analyzer instruction sequence; and
  storing in the operating RAM the resulting plurality of magnitude values at the plurality of frequency stops generated by the spectrum analyzer instruction sequence.

21. The modem of claim 18 wherein the warm-start preference instruction sequence captures the communications channel condition by determining an echo-path model for the communications channel.

22. The modem of claim 21 further comprising:
a probing signal generator capable of injecting a probing signal into a send-path of the communications channel;
a sampling unit that creates digital values representative of the signal level present on a receive-path of the communications channel; and
an echo-sampler instruction sequence stored in the program memory and wherein the warm-start preference instruction sequence minimally causes the processor to execute the echo-sampler instruction sequence and wherein the echo-sampler instruction sequence minimally determines the echo-path model for the communications channel by minimally:
  commanding the probing signal generator to inject the probing signal into the send-path of the communications channel;
  obtaining a series of digital values from the sampling unit;
  creating coefficients from the digital values that depict an impulse response of a remnant of the probing signal received on the receive-path of the communications channel; and
  storing the coefficients in the operating RAM.

23. The modem of claim 18 wherein the warm-start preference instruction sequence minimally captures the communications channel condition by minimally determining a spectrum response for the communications channel.

24. The modem of claim 23 further comprising:
a probing signal generator capable of injecting a probing signal into a send-path of the communications channel;
a spectral response instruction sequence stored in the program memory and wherein the warm-start preference instruction sequence minimally causes the processor to execute the spectral response instruction sequence and wherein the spectral response instruction sequence minimally determines the spectral response for the communications channel by minimally:
  commanding the probing signal generator to inject the probing signal into the send-path of the communications channel; and
  commanding the remote modem to measure the spectral density of the probing signal as it is received by the remote modem.

25. The modem of claim 23 further comprising:
a sampling unit that creates digital values representative of the signal level present on a receive-path of the communications channel;
a spectral response instruction sequence stored in the program memory,
a spectrum analyzer instruction sequence stored in the program memory that minimally creates a plurality of magnitude values at a plurality of frequency stops based on a series of magnitude samples and wherein the warm-start preference instruction sequence minimally causes the processor to execute the spectral response instruction sequence and wherein the spectral response instruction sequence minimally determines the spectral response for the communications channel by minimally:
  commanding a remote signal source to transmit a probing signal;
  obtaining a series of digital values from the sampling unit;
  causing the processor to execute the spectrum analyzer instruction sequence; and
  storing in the operating RAM the resulting plurality of magnitude values at the plurality of frequency stops generated by the spectrum analyzer instruction sequence.

26. A modem comprising:
a demodulator
a program memory for storing instruction sequences;
an operating RAM for storing variables;
an integrated warm-start instruction sequence stored in the program memory; and
a processor that executes the integrated warm-start instruction sequence that minimally:
  measures a condition of a communications channel connected to the demodulator after having determined that a connection with a remote modem needs to be terminated and stores an initial communications channel condition indicator in the operating RAM;
  saves original coefficients descriptive of the condition of the communications channel in the operating RAM and if a modem connection needs to be re-established:
    takes a current measurement of a communications channel condition;
    if the difference between the initial communications channel condition indicator and the current communications channel condition measurement exceeds a first threshold engages in modem training and develops new coefficients descriptive of the condition of the communications channel condition and then conveys the new coefficients with the remote modem; and if the difference between the initial communications channel condition indicator and the current communications channel condition measurement does not exceed the first threshold recalls the original coefficients from the operating RAM.

27. The modem of claim 26 wherein the integrated warm-start instruction sequence further causes the processor to execute a coefficient adjustment instruction sequence that minimally adjusts the original coefficients recalled from the operating RAM to account for minor variations in a line condition if the difference between the initial communications channel condition indicator and the current communications channel condition measurement does not exceed a second threshold.

28. The modem of claim 26 wherein the integrated warm-start instruction sequence measures the communications channel condition by measuring noise present on the communications channel.

29. The modem of claim 26 further comprising:
a sampling unit that creates digital values representative of the signal level present on the communications channel; and
a spectrum analyzer instruction sequence stored in the program memory that minimally creates a plurality of magnitude values at a plurality of frequency stops based on a series of magnitude samples and wherein the integrated warm-start instruction sequence measures noise by minimally:
obtaining the series of magnitude samples from the sampling unit;
causing the processor to execute the spectrum analyzer instruction sequence; and
storing in the operating RAM a resulting plurality of magnitude values at the plurality of frequency stops generated by the spectrum analyzer instruction sequence.

30. The modem of claim 26 wherein the integrated warm-start instruction sequence measures the communications channel condition by determining an echo-path-model for the communications channel.

31. The modem of claim 30 further comprising:
a probing signal generator capable of injecting a probing signal into a send-path of the communications channel;
a sampling unit set that creates digital values representative of the signal level present on a receive-path of the communications channel; and
an echo-sampling instruction sequence stored in the program memory and wherein the integrated warm-start instruction sequence minimally causes the processor to execute the echo-sampling instruction sequence and wherein the echo-sampling instruction sequence minimally determines the echo-path model for the communications channel by minimally:
commanding the probing signal generator to inject the probing signal into the send-path of the communications channel;
obtaining a series of digital values for the sampling unit;
creating new coefficients from the digital values that depict an impulse response of remnant of the probing signal received on the receive-path of the communications channel; and
storing the new coefficients in the operating RAM.

32. The modem of claim 26 wherein the integrated warm-start instruction sequence minimally measures the communications channel condition by determining a spectral response on the communications channel.

33. The modem of claim 32 further comprising:
a probing signal generator capable of injecting a probing signal into a send-path of the communications channel;
a spectral response instruction sequence stored in the program memory and wherein the integrated warm-start instruction sequence minimally causes the processor to execute the spectral response instruction sequence and wherein the spectral response instruction sequence minimally determines the spectral response on the communications channel by minimally:
commanding the probing signal generator to inject the probing signal into the send-path of the communications channel;
commanding the remote modem to measure the spectral density of the probing signal as it is received by the remote modem.

34. The modem of claim 32 further comprising:
a sampling unit that creates digital values representative of the signal level present on a receive-path of the communications channel;
a spectral response instruction sequence stored in the program memory;
a spectrum analyzer instruction sequence stored in the program memory that minimally creates a plurality of magnitude values at a plurality of frequency stops based on a series of magnitude samples and wherein the integrated warm-start instruction sequence minimally causes the processor to execute the spectral response instruction sequence and wherein the spectral response instruction sequence minimally determines the spectral response on the communications channel by minimally:
commanding a remote signal source to transmit a probing signal;
obtaining a series of digital values from the sampling unit;
causing the processor to execute the spectrum analyzer instruction sequence; and
storing in the operating RAM a resulting plurality of magnitude values at the plurality of frequency stops generated by the spectrum analyzer instruction sequence.

* * * * *